(12) United States Patent
Hirayama et al.

(10) Patent No.: US 8,428,439 B2
(45) Date of Patent: Apr. 23, 2013

(54) BROADCAST PROGRAM RECORDING/REPRODUCING DEVICE AND BROADCAST PROGRAM RECORDING/REPRODUCING METHOD

(75) Inventors: Kazuhiko Hirayama, Osaka (JP); Kohji Okuno, Osaka (JP)

(73) Assignee: Panasonic Corporation, Osaka (JP)

( * ) Notice: Subject to any disclaimer, the term of this patent is extended or adjusted under 35 U.S.C. 154(b) by 1663 days.

(21) Appl. No.: 11/630,330

(22) PCT Filed: Jun. 14, 2005

(86) PCT No.: PCT/JP2005/010835
§ 371 (c)(1),
(2), (4) Date: Dec. 21, 2006

(87) PCT Pub. No.: WO2006/006334
PCT Pub. Date: Jan. 19, 2006

(65) Prior Publication Data
US 2007/0189712 A1      Aug. 16, 2007

(30) Foreign Application Priority Data

Jul. 9, 2004   (JP) ................................ 2004-202848

(51) Int. Cl.
*H04N 5/92* (2006.01)
(52) U.S. Cl.
USPC ........................................................ 386/326
(58) Field of Classification Search .................. None
See application file for complete search history.

(56) References Cited

U.S. PATENT DOCUMENTS

| | | | |
|---|---|---|---|
| 2004/0052504 A1* | 3/2004 | Yamada et al. | ................. 386/68 |
| 2007/0111657 A1 | 5/2007 | Yamada et al. | |
| 2008/0248786 A1 | 10/2008 | Yamada et al. | |

FOREIGN PATENT DOCUMENTS

| | | |
|---|---|---|
| CN | 1496122 A | 5/2004 |
| JP | 11-68686 | 3/1999 |
| JP | 2003-69910 | 3/2003 |
| JP | 2003-110955 | 4/2003 |
| JP | 2003-319363 | 11/2003 |
| JP | 2003-329459 | 11/2003 |
| JP | 2004-140460 | 5/2004 |

\* cited by examiner

*Primary Examiner* — William C Vaughn, Jr.
*Assistant Examiner* — Daniel Tekle
(74) *Attorney, Agent, or Firm* — Wenderoth, Lind & Ponack, L.L.P.

(57) ABSTRACT

A broadcast program recording/reproducing device is provided that is capable of continuously reproducing a program recorded so as to be distributed between a plurality of devices. A reception level detection unit (105) detects the reception level of the received broadcast electric wave. When the reception level is equal to or lower than a predetermined reception level, a recording request transmission unit (106) generates a recording start request packet, and transmits it to a server (20). A management information write unit (107) writes management information into a terminal storage unit (104). A continuous reproduction control unit (108) determines whether the program is recorded so as to be distributed between storing means and an external device based on the management information. When the program is recorded so as to be distributed, the continuous reproduction control unit (108) obtains an appropriate part of the program from the terminal storage unit (104) and a server (20) based on the management information and continuously reproduces it, and when the program is not recorded so as to be distributed, the continuous reproduction control unit (108) obtains the program from the terminal storage unit (104) and reproduces it.

19 Claims, 11 Drawing Sheets

- MAXIMUM RECEPTION LEVEL
- RECEPTION LEVEL A
- RECEPTION LEVEL B
- MINIMUM RECEPTION LEVEL

| ALTERNATIVE RECORDING START COMMAND : 0x0a |
|---|
| A/V FILE NAME |
| CHANNEL NAME OF ALTERNATIVELY RECORDED PROGRAM |
| RECORDING RATE OF ALTERNATIVELY RECORDED PROGRAM |
| RECORDING FORMAT OF ALTERNATIVELY RECORDED PROGRAM |

| ALTERNATIVE RECORDING STOP COMMAND : 0x0b |
|---|
| A/V FILE NAME |

FIG. 4

| A/V FILE NAME:A/V FILE 1 |
| --- |
| ELAPSED TIME TO STOP OF RECORDING, AND OVERLAPPING REDORDING TIME |
| A/V FILE NAME:A/V FILE 2 |
| IP ADDRESS OF SERVER |
| ELAPSED TIME FROM STOP TO RESUMPTION OF CRECORDING |
| A/V FILE NAME:A/V FILE 3 |
| ELAPSED TIME TO STOP OF RECORDING, AND OVERLAPPING RECORDING TIME |

FIG. 5

| PROGRAM TRANSMISSION REQUEST COMMAND : 0x0c |
| --- |
| A/V FILE NAME 2 |

BROADCAST PROGRAM RECORDING/REPRODUCING DEVICE AND BROADCAST PROGRAM RECORDING/REPRODUCING METHOD

TECHNICAL FIELD

The present invention relates to a broadcast program recording/reproducing device and a broadcast program recording/reproducing method to reproduce a recorded broadcast program, and more specifically, to a broadcast program recording/reproducing device and a broadcast program recording/reproducing method to reproduce a broadcast program recorded so as to be distributed between a plurality of devices.

BACKGROUND ART

In recent years, performance improvements and functionality enhancement of semiconductors have been allowing mobile devices represented by a mobile phone to capture and reproduce images. Further, it is predicted that when the digital terrestrial broadcasting for mobile devices is started in the future, the recording of digital broadcasts and the reproduction of the recorded broadcast images on the mobile devices will be realized as well as the watching of broadcast programs on the mobile devices.

However, when a broadcast electric wave is received by a mobile device, moving of the mobile device outside the broadcast electric wave area or moving of the user, who carries the mobile device, at high speed in a means of transportation causes timing when the broadcast electric wave cannot be received correctly to occur. A method of solving the problem with respect to stably receiving the broadcast electric wave by use of a mobile device and recording the received broadcast program on the mobile device is to record the broadcast program by a server device capable of stably receiving broadcasts instead of by the mobile device (for example, Patent Document 1).

According to the conventional broadcast program recording method described in the Patent Document 1, a server records a broadcast program based on a recording request from a terminal device such as a mobile device. Then, the server distributes the recorded broadcast program to the terminal device. By doing this, broadcast programs of stable quality can be watched on the terminal device.

[Patent Document 1] Japanese Laid-Open Patent Publication No. 2003-319363

DISCLOSURE OF THE INVENTION

Problems to be Solved by the Invention

However, according to the conventional broadcast program recording method described in the Patent Document 1, since the server records all the programs to be recorded, the amount of data transferred from the server to the terminal device is enormous. Consequently, the charge for the use of the network is high.

To solve this problem, a method is considered such that when the reception condition of the broadcast electric wave is excellent, the terminal device records the broadcast program and when the reception condition is deteriorated, the server is requested to record the broadcast program. However, when this method is used, the broadcast program is recorded so as to be distributed between the terminal device and the server. When watching the broadcast program separately recorded in a plurality of devices, the user has to switch between the part of the program recorded by the terminal device and the part of the program recorded by the server to reproduce the program. Consequently, the load on the user is increased. In addition, when this method is used, a problem of quality arises that the reproduction is interrupted every time the image is switched.

Accordingly, an object of the present invention is to provide a broadcast program recording/reproducing device and a broadcast program recording/reproducing method capable of continuously reproducing a program recorded so as to be distributed between a plurality of devices.

Solution to the Problems

The present invention is a broadcast program recording/reproducing device which records a program being broadcast and reproduces the program, and comprises: a storage unit operable to store the program; a program write unit operable to write the received program into the storage unit; a reception level detection unit operable to detect a reception level of a received broadcast electric wave; a recording start request transmission unit operable, when the reception level detected by the reception level detection unit is equal to or lower than a predetermined reception level, to generate a recording start request to request an external device to alternatively record at least part of the program, and to transmit the recording start request to the external device; a management information storage unit operable to store management information to manage a destination of the recording of the program and a timing to switch the recording; a distributive recording determination unit operable to determine whether the program is recorded so as to be distributed between the storage unit and the external device based on the management information stored in the management information storage unit; and a continuous reproduction unit operable to obtain an appropriate part of the program from the storage unit and the external device and to continuously reproduce the program based on the management information when the distributive recording determination unit determines that the program is recorded so as to be distributed, and to obtain the program from the storage unit and to reproduce the program when the distributive recording determination unit determines that the program is not recorded so as to be distributed.

Moreover, the present invention is a broadcast program recording device which records a program being broadcast, and comprises: a storage unit operable to store the program; a program write unit operable to write the received program into the storage unit; a reception level detection unit operable to detect a reception level of a received broadcast electric wave; a recording start request transmission unit operable, when the reception level detected by the reception level detection unit is equal to or lower than a predetermined reception level, to generate a recording start request to request an external device to alternatively record at least part of the program, and to transmit the recording start request to the external device; and a management information storage unit operable to store management information to manage a destination of the recording of the program and a timing to switch the recording.

Moreover, the present invention is a broadcast program reproduction device that reproduces a broadcast program stored in a storage unit, management information to manage a destination of the recording of the broadcast program and a timing to switch the recording is stored in the storage unit, and the broadcast program reproduction device comprises: a distributive recording determination unit operable to determine whether the program is recorded so as to be distributed between the storage unit and the external device based on the management information; and a continuous reproduction unit operable to obtain an appropriate part of the broadcast program from the storage unit and the external device and to continuously reproduce the program based on the management information when the distributive recording determination unit determines that the broadcast program is recorded so as to be distributed, and to obtain the broadcast program from the storage unit and to reproduce the broadcast program when the distributive recording determination unit determines that the broadcast program is not recorded so as to be distributed.

Moreover, the present invention is a broadcast program recording/reproducing method of recording a program being broadcast and reproducing the program, and comprises: a step of writing a received program into a storage unit; a step of detecting a reception level of a received broadcast electric wave; a step of, when the reception level detected at the step of detecting the reception level is equal to or lower than a predetermined reception level, generating a recording start request to request an external device to alternatively record at least part of the program, and transmitting the recording start request to the external device; a step of storing management information to manage a destination of the recording of the program and a timing to switch the recording; a step of determining whether the program is recorded so as to be distributed between the storage unit and the external device based on the management information stored at the step of storing the management information; and a step of obtaining an appropriate part of the program from the storage unit and the external device based on the management information and continuously reproducing the program when it is determined that the program is recorded so as to be distributed at the step of determining the presence or absence of the distributive recording, and obtaining the program from the storage unit and reproducing the program when it is determined that the program is not recorded so as to be distributed at the step of determining the presence or absence of the distributive recording.

Moreover, the present invention is a program for recording a program being broadcast and reproducing the program, and comprises: a step of writing a received program into storage unit; a step of detecting a reception level of a received broadcast electric wave; a step of, when the reception level detected at the step of detecting the reception level is equal to or lower than a predetermined reception level, generating a recording start request to request an external device to alternatively record at least part of the program, and transmitting the recording start request to the external device; a step of storing management information to manage a destination of the recording of the program and a timing to switch the recording; a step of determining whether the program is recorded so as to be distributed between the storage unit and the external device based on the management information stored at the step of storing the management information; and a step of obtaining an appropriate part of the program from the storage unit and the external device based on the management information and continuously reproducing the program when it is determined that the program is recorded so as to be distributed at the step of determining the presence or absence of the distributive recording, and obtaining the program from the storage unit and reproducing the program when it is determined that the program is not recorded so as to be distributed at the step of determining the presence or absence of the distributive recording.

Moreover, the present invention is an integrated circuit of a broadcast program recording/reproducing device which records a program being broadcast and reproduces the program, and comprises: a storage unit operable to store the program; a program write unit operable to write the received program into the storage unit; a reception level detection unit operable to detect a reception level of a received broadcast electric wave; a recording start request transmission unit operable, when the reception level detected by the reception level detection unit is equal to or lower than a predetermined reception level, to generate a recording start request to request an external device to alternatively record at least part of the program, and to transmit the recording start request to the external device; management information a storage unit operable to store management information to manage a destination of the recording of the program and a timing to switch the recording; a distributive recording determination unit operable to determine whether the program is recorded so as to be distributed between the storage unit and the external device based on the management information stored in the management information storage unit; and a continuous reproduction unit operable to obtain an appropriate part of the program from the storage unit and the external device and to continuously reproduce the program based on the management information when the distributive recording determination unit determines that the program is recorded so as to be distributed, and to obtain the program from the storage unit and to reproduce the program when the distributive recording determination unit determines that the program is not recorded so as to be distributed.

Effect of the Invention

According to the present invention, a broadcast program recording/reproducing device and a broadcast program recording/reproducing method capable of continuously reproducing a program recorded so as to be distributed between a plurality of devices are provided.

BRIEF DESCRIPTION OF THE DRAWINGS

FIG. 4 is a diagram showing an example of a management table 121.

FIG. 5 is a diagram showing an example of a format of a program transmission request packet.

Figure 1:
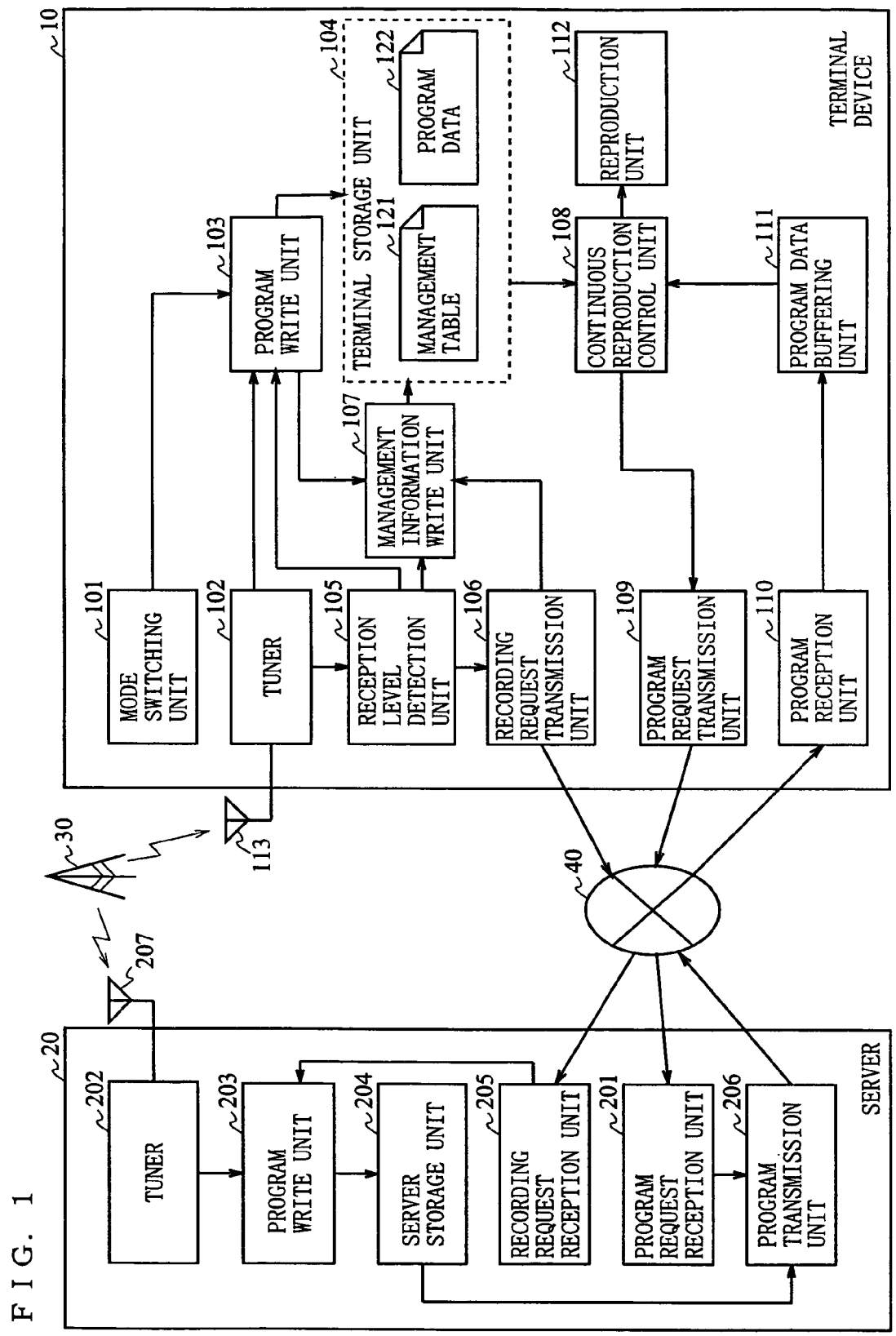
FIG. 1 is a diagram showing the structure of a broadcast program recording/reproducing system having a broadcast program recording/reproducing device according to a first embodiment of the present invention.

DESCRIPTION OF THE REFERENCE CHARACTERS 10 terminal device
20 server
30 broadcast transmission antenna
40 Internet
102, 202 tuner
103, 203 program write unit
104 terminal storage unit
105 reception level detection unit
106 recording request transmission unit
107 management information write unit
108 continuous reproduction control unit
109 program request transmission unit
110 program reception unit
111 program data buffering unit
113, 207 reception antenna
121 management table
122 program data
201 program request reception unit
204 server storage unit
205 recording request reception unit
206 program transmission unit
301, 303 elapsed time to the stop of the recording
302 elapsed time from the stop of the recording to the resumption of the recording
401, 402 overlapping recording time
501 to 503, 601 to 603 elapsed time

BEST MODE FOR CARRYING OUT THE INVENTION

Hereinafter, embodiments of the present invention will be described with reference to the drawings.

(First Embodiment)

FIG. 1 is a diagram showing the structure of a broadcast program recording/reproducing system having a broadcast program recording/reproducing device according to a first embodiment of the present invention. In FIG. 1, the broadcast program recording/reproducing system has a terminal device 10 and a server 20. The terminal device 10 and the server 20 communicate with each other through the Internet 40.

The terminal device 10 is, typically, a mobile information processing terminal, for example, a mobile phone, a PDA, a portable PC, and a car navigation system having a broadcast reception function. The terminal device 10 receives broadcast programs (hereinafter, referred to as programs) transmitted from a broadcast transmission antenna 30, records the received programs, and reproduces the recorded programs. When the reception level of the broadcast program is decreased, the terminal device 10 instructs the server 20 to record the broadcast program instead of itself. Hereinafter, the recording of the broadcast program by the server 20 instead of by the terminal device 10 will be referred to as alternative recording. When the program is divided, the terminal device 10 obtains the appropriate parts of the program from itself and the server 20, and reproduces the program seamlessly and continuously.

The server 20 receives and alternatively records the program broadcast from the broadcast transmission antenna 30 in response to an instruction from the terminal device 10. In addition, the server 20 transmits the program to the terminal device 10 in response to an instruction from the terminal device 10.

The terminal device 10 includes a mode switching unit 101, a tuner 102, a program write unit 103, a terminal storage unit 104, a reception level detection unit 105, a recording request transmission unit 106, a management information write unit 107, a continuous reproduction control unit 108, a program request transmission unit 109, a program reception unit 110, a program data buffering unit 111, a reproduction unit 112, and a reception antenna 113.

The mode switching unit 101 controls the timing to start the program recording. When the recording mode is selected, the mode switching unit 101 instructs the program write unit 103 to start the recording of the broadcast program. Thereby, a desired program can be recorded while a program is reproduced by the terminal device 10. The selection of the recording mode is made, for example, by receiving a broadcast program recording request instruction from the user through a non-illustrated input unit. The criterion of the judgment that the selection of the recording mode is made may be, for example, a request from an unattended recording program as well as an instruction from the user.

The reception antenna 113 receives programs transmitted from the broadcast transmission antenna 30. The tuner 102 performs decoding on the data of the program received by the reception antenna 113.

The program write unit 103 starts the writing of the program decoded by the tuner 102, into the terminal storage unit 104 in response to an instruction from the mode switching unit 101. Moreover, the program write unit 103 stops the writing of the program in response to an instruction from the reception level detection unit 105 described next. Further, the program write unit 103 notifies the management information write unit 107 of the file name given to the program written into the terminal storage unit 104.

The terminal storage unit 104 is a storage device such as a memory or a hard disk, and stores data 122 necessary for reproducing the program as A/V file data. Moreover, the terminal storage unit 104 stores the management table 121 where management information is recorded, and details thereof will be described later.

The reception level detection unit 105 receives the reception level of the broadcast electric wave from the tuner 102, and monitors the change in the reception level. This enables the detection of the change, in the reception level of the broadcast electric wave, responsive to a movement of the terminal device 10.

Figures 2, 3A, 3B:
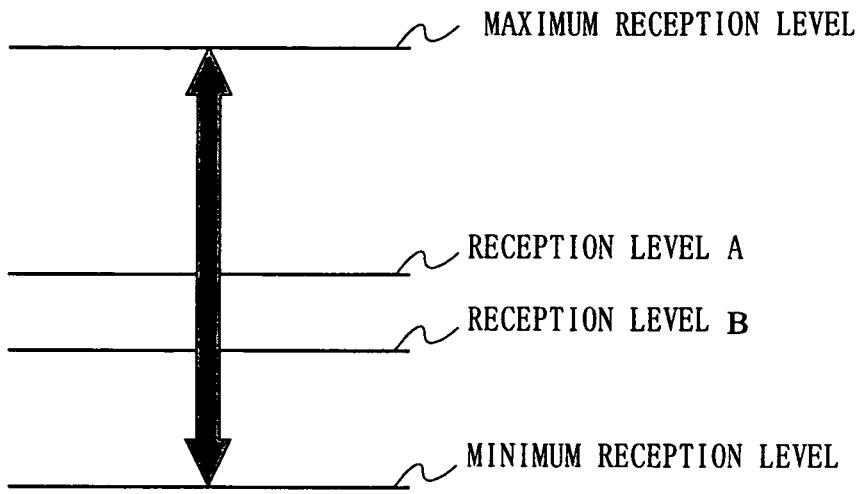
FIG. 2 is a diagram showing the relation among the reception levels that a reception level detection unit 105 uses as the judgment criterion for the control.
FIG. 3A is a diagram showing an example of a format of a recording start request packet.
FIG. 3B is a diagram showing an example of a format of a recording stop packet.

FIG. 2 is a diagram showing the relation among the reception levels that the reception level detection unit 105 uses as the judgment criterion for the control. In FIG. 2, reception levels of the broadcast electric wave increase in upward direction, and conversely, reception levels of the received electric wave decrease in downward direction. The uppermost line represents the maximum reception level detected by the reception level detection unit 105. The second line from the top represents a first threshold value (hereinafter, referred to as reception level A), and when the detected reception level of the broadcast electric wave becomes equal to or lower than the reception level A, the reception level detection unit 105 generates a reception level A reduction notification, and passes it to the recording request transmission unit 106 and the management information write unit 107.

The third line from the top represents a second threshold value (hereinafter, referred to as reception level B), and when the detected reception level of the broadcast electric wave becomes equal to or lower than the reception level B, the reception level detection unit 105 generates a reception level B reduction notification, and passes it to the management information write unit 107 and the program write unit 103. After the generation of the level B reduction notification, when the detected reception level of the broadcast electric wave is restored and becomes higher than the reception level B, the reception level detection unit 105 generates a reception level B restoration notification, and passes it to the management information write unit 107 and the program write unit 103.

On the other hand, after the generation of the level A reduction notification, when the detected reception level of the broadcast electric wave is restored and becomes higher than the reception level A, the reception level detection unit 105 generates a reception level A restoration notification, and passes it to the recording request transmission unit 106 and the management information write unit 107. The reception level detection unit 105 stores, in a non-illustrated memory, information indicating that the reception level A reduction notification, the reception level B reduction notification, the reception level B restoration notification, and the reception level A restoration notification are generated. Then, with reference to the memory, the reception level detection unit 105 determines which reception level is to be monitored.

After generating the reception level A reduction notification, the reception level detection unit 105 monitors whether the reception level of the broadcast electric wave becomes equal to or lower than the reception level B, or whether it becomes higher than the reception level A. Moreover, after generating the reception level B reduction notification, the reception level detection unit 105 monitors whether the reception level of the broadcast electric wave becomes higher than the reception level B. After generating the reception level B restoration notification, the reception level detection unit 105 monitors whether the reception level of the broadcast electric wave becomes equal to or lower than the reception level B, or whether it becomes higher than the reception level A. After generating the reception level A restoration notification, the reception level detection unit 105 monitors whether the reception level of the broadcast electric wave becomes equal to or lower than the reception level A.

Returning to the explanation of FIG. 1, when receiving the reception level A reduction notification, the recording request transmission unit 106 generates a recording start request packet, and transmits it to the server 20. When receiving the reception level A restoration notification, the recording request transmission unit 106 generates a recording stop request packet, and transmits it to the server 20.

FIG. 3A is a diagram showing an example of a format of the recording start request packet. The recording start request packet includes a recording start command, an A/V file name, a channel name, a recording rate, and a recording format. The recording start request command is a command to instruct the server 20 to start the alternative recording, and is represented by "0x0a" in the example shown in FIG. 3A. The A/V file name is the file name to be given to the program alternatively recorded by the server 20. The file name to be given to the program alternatively recorded by the server 20 is determined by the recording request transmission unit 106. The recording request transmission unit 106 notifies the management information write unit 107 of the determined file name. The channel name is information to specify the channel of the program to be alternatively recorded by the server 20. The recording rate is information to specify the recording rate when the server 20 alternatively records the program. The recording format is information to specify the recording format when the server 20 alternatively records the program.

FIG. 3B is a diagram showing an example of a format of the recording start stop packet. The recording start stop packet includes a recording stop command and an A/V file name. The recording stop command is a command to instruct the server 20 to stop the alternative recording, and is represented as "0x0b" in the example shown in FIG. 3B. The A/V file name is the file name given to the program of which the alternative recording by the server 20 is to be stopped.

Returning to the explanation of FIG. 1, the management information write unit 107 records the information necessary for continuous reproduction in the management table 121 as the management information based on the notification received from the reception level detection unit 105. The management information includes, for example, the information representative of the destination of the recording of the program (the terminal device 10 or the server 20) and the information representative of the reproduction timing thereof.

FIG. 4 is a diagram showing an example of the management table 121. FIG. 4 depicts an example in which one program is recorded so as to be distributed among three pieces of file data, A/V files 1 to 3. When the management information on the program recorded by the terminal device 10 is recorded in the management table 121, the elapsed time to the stop of the recording and the overlapping recording time are recorded in association with an A/V file name. When the management information on the program alternatively recorded by the server 20 is recorded, the IP address of the server and the elapsed time from the stop to the resumption of the recording are recorded in association with an A/V file name. The IP address of the server is the identifier (ID) to specify the server 20, and is the information to specify the destination of the transmission of the alternative recording start packet and the alternative recording stop packet.

In the example shown in FIG. 4, the A/V file 1 and the A/V file 3 are the program recorded by the terminal device 10, and the A/V file 2 is the program alternatively recorded by the server 20. The management information write unit 107 writes, into the management table 121, the time from the start of the writing of the A/V file 1 to the reception of the level B reduction notification as the "elapsed time to the stop of the recording" in association with the A/V file 1. At this time, the management information write unit 107 writes, into the management table 121, the time from the reception of the level A reduction notification to the reception of the level B reduction notification as the "overlapping recording time" together with the elapsed time to the stop of the recording.

Moreover, the management information write unit 107 writes, into the management table 121, the time from the reception of the level B reduction notification to the reception of the level B restoration notification as the "elapsed time from the stop to the resumption of the recording" together with the IP address of the server 20 in association with the A/V file 2. Further, the management information write unit 107 writes, into the management table 121, the time from the timing of the reception of the level B restoration notification (the timing of the start of the writing of the A/V file 3) to the end of the program recording as the "elapsed time to the stop of the recording" in association with the A/V file 3. At this time, the management information write unit 107 writes, into the management table 121, the time from the reception of the level B restoration notification to the reception of the level A restoration notification as the "overlapping recording time" together with the elapsed time to the stop of the recording.

Next, the components associated with the reproduction of the recorded and alternatively recorded programs will be described.

The continuous reproduction control unit 108 performs the processing necessary for continuously reproducing the divided program. Specifically, the continuous reproduction control unit 108 reads the management table 121 from the terminal storage unit 104 and refers to it. When a program alternatively recorded by the server 20 is present, the continuous reproduction control unit 108 instructs the program request transmission unit 109 to transmit a program transmission request packet to the server 20.

Then, according to the record in the management table 121, the continuous reproduction control unit 108 determines from which of the terminal storage unit 104 and the program data buffering unit 111 the program to be reproduced is to be read. When the program held by the terminal storage unit 104 is reproduced, the continuous reproduction control unit 108 reads at least part of the broadcast program from the terminal storage unit 104, and outputs it to the reproduction unit 112. On the other hand, when the program alternatively recorded by the server 20 is reproduced, the continuous reproduction control unit 108 reads the program alternatively recorded by the server 20 from the program data buffering unit 111, and outputs it to the reproduction unit 112.

The program request transmission unit 109 generates the program transmission request packet in response to the instruction from the continuous reproduction control unit 108, and transmits it to the server 20.

When receiving the program transmitted from the server 20, the program reception unit 110 writes the received program into the program data buffering unit 111. The program data buffering unit 111 temporarily holds the program received by the program reception unit 110.

The reproduction unit 112 includes, for example, a monitor and a speaker, and reproduces the program outputted from the continuous reproduction control unit 108. For example, when the reproduction unit 112 includes a monitor and a speaker, the image is outputted to the monitor, and the sound is outputted to the speaker.

FIG. 5 is a diagram showing an example of a format of the program transmission request packet. The program transmission request packet includes a program transmission request command and an A/V file name. The program transmission request command is a command to provide an instruction to transmit the program alternatively recorded by the server 20, and is represented as "0x0c" in the example shown in FIG. 5. The A/V file name is the file name of the program that the server 20 is requested to transmit.

Returning to the explanation of FIG. 1, the server 20 includes a program request reception unit 201, a tuner 202, a program write unit 203, a server storage unit 204, a recording request reception unit 205, a program transmission unit 206, and a reception antenna 207.

The reception antenna 207 receives the program transmitted from the broadcast transmission antenna 30. The tuner 202 performs decoding on the data of the broadcast program received by the reception antenna 207.

When receiving the program transmission request packet transmitted from the terminal device 10, the program request reception unit 201 instructs the program transmission unit 206 to transmit the program held by the server storage unit 204 to the terminal device 10.

The program write unit 203 writes the program decoded by the tuner 202 into the server storage unit 204 in response to an instruction from the recording request reception unit 205. The server storage unit 204 is a storage device such as a memory or a hard disk, and stores data necessary for reproducing the program as A/V file data.

When receiving the recording start request packet transmitted from the terminal device 10, the recording request reception unit 205 instructs the program write unit 203 to record the specified program into the server storage unit 204. When receiving the recording stop request packet transmitted from the terminal device 10, the recording request reception unit 205 instructs the program write unit 203 to stop the recording of the specified program.

In response to an instruction from the program request reception unit 201, the program transmission unit 206 reads the program from the server storage unit 204, and transmits it to the terminal device 10.

Figure 6:
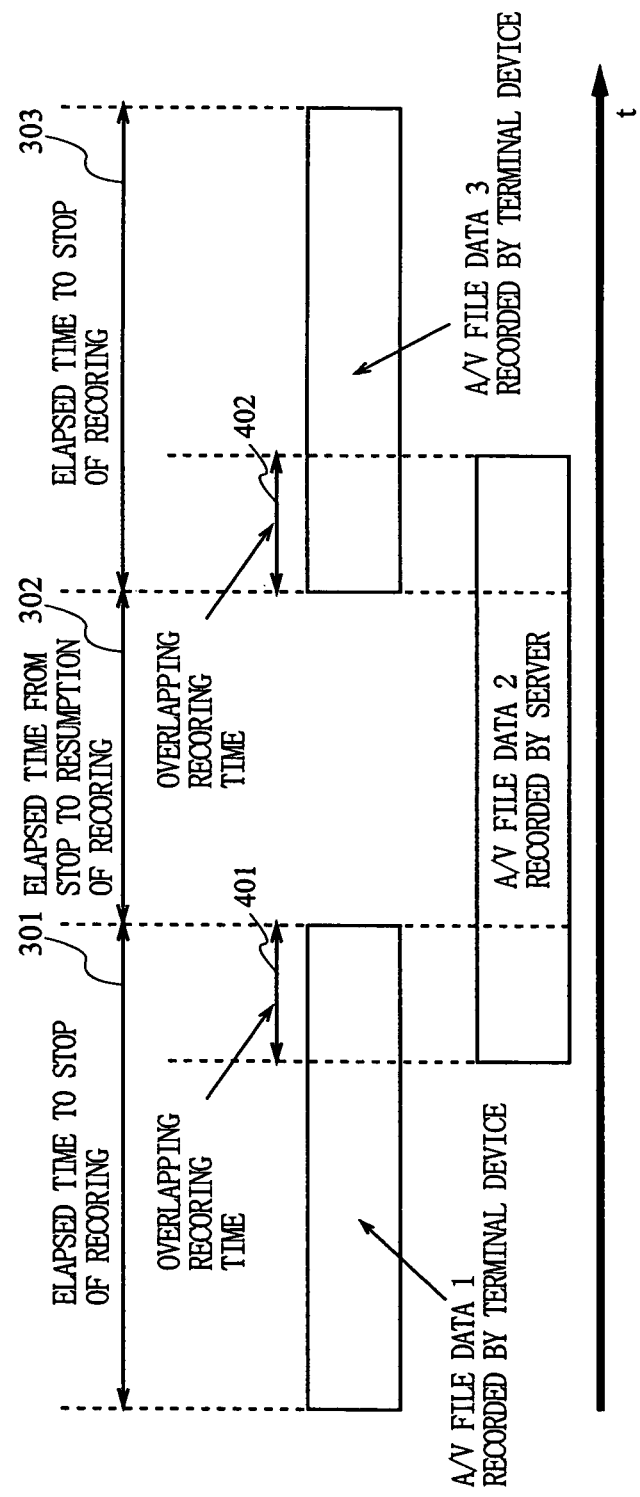
FIG. 6 is a diagram showing an example of the timing when a terminal device 10 continuously reproduces the program recorded by itself and the program alternatively recorded by a server 20.

FIG. 6 is a diagram showing an example of the timing when the terminal device 10 continuously reproduces the program recorded by itself and the program alternatively recorded by the server 20. FIG. 6 depicts an example in which the program is recorded in the order of the A/V file 1, the A/V file 2, and the A/V file 3. The A/V file 1 and the A/V file 3 are the part of the program recorded by the terminal device 10, and the A/V file 2 is the part of the program alternatively recorded by the server 20.

As shown in FIG. 6, an end part of the A/V file 1 recorded by the terminal device 10 and a start part of the A/V file 2 recorded by the server 20 are common to each other. An end part of the A/V file 2 recorded by the server 20 and a start part of the A/V file 3 recorded by the terminal device 10 are common to each other.

The time for which the same program is recorded so as to overlap like this will be referred to as the overlapping recording time. The overlapping recording time corresponds to a so-called "overlap width." This is intentionally realized by providing the two threshold values, the reception levels A and B, and making different the timing to request the server 20 to perform the alternative recording and the timing to stop the program recording by the terminal device 10. The A/V files 2 and 3 have an overlapping recording time 402 similarly to the A/V files 1 and 2.

Figure 7:
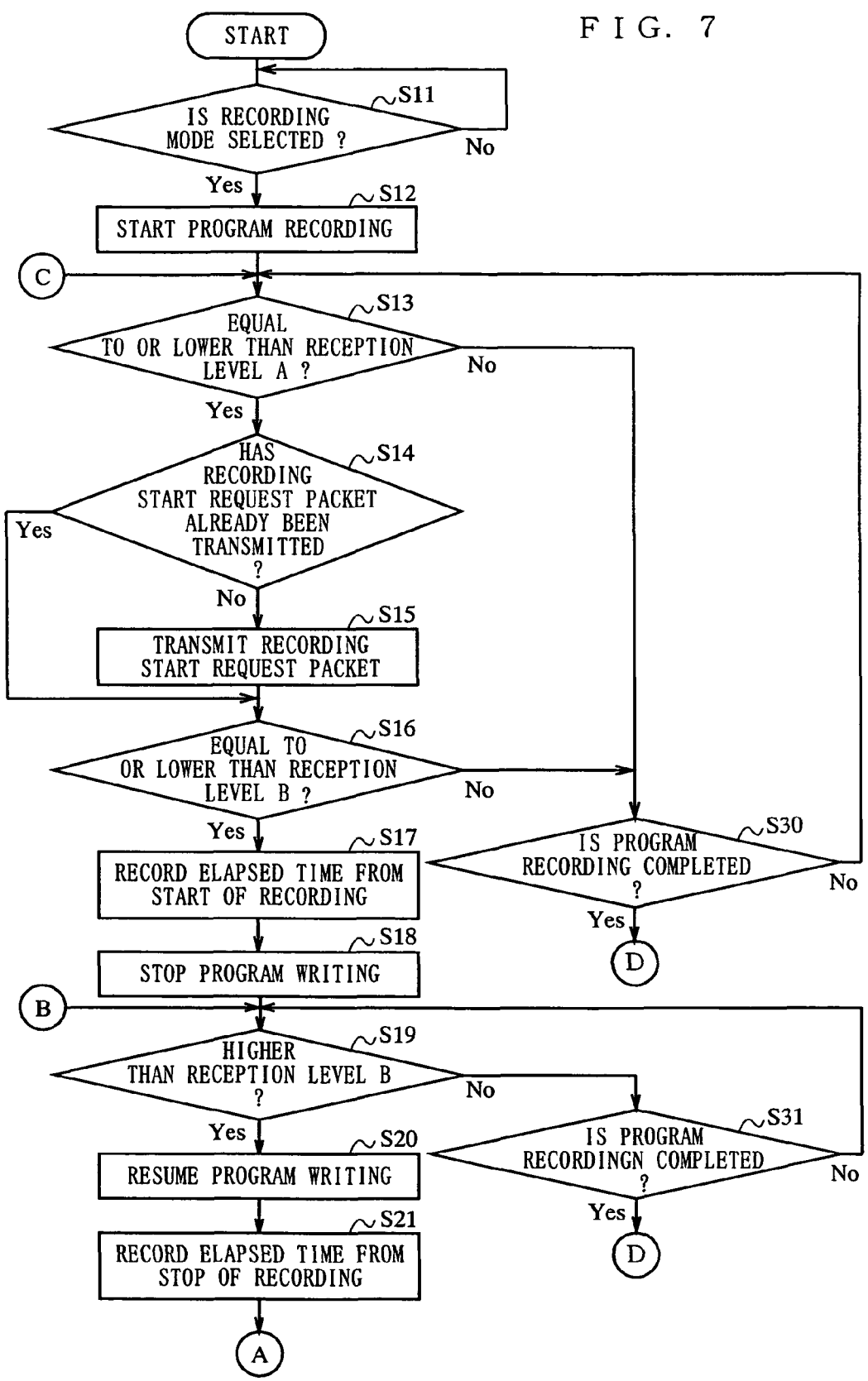
FIG. 7 is a flowchart showing the operation of the terminal device 10.
Figure 8:
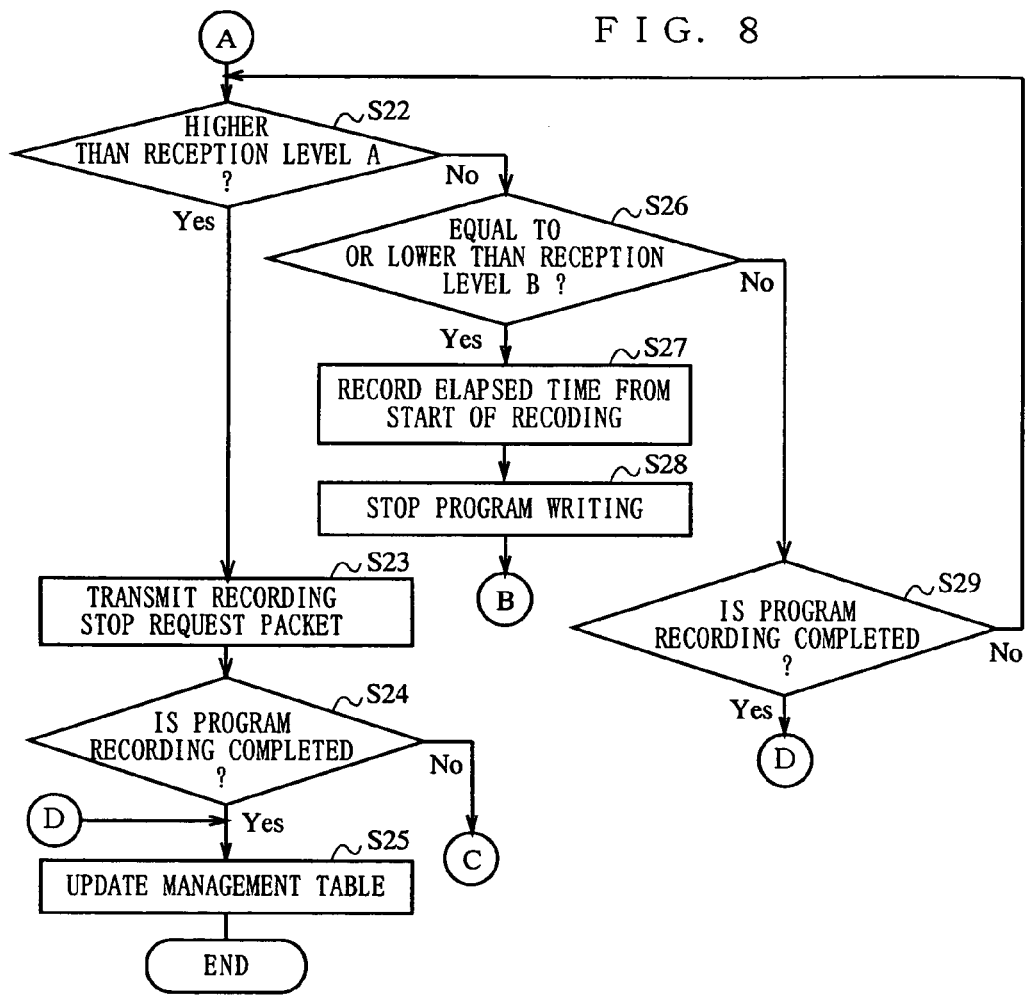
FIG. 8 is a flowchart showing the operation of the terminal device 10.

FIGS. 7 and 8 are flowcharts showing the operation of the terminal device 10.

First, the mode switching unit 101 determines whether the recording mode is selected (step S11). When the recording mode is not selected (No at step S11), the mode switching unit 101 repeats the processing of step S11 until the recording mode is selected. When the recording mode is selected (Yes at step S11), the mode switching unit 101 instructs the program write unit 103 to start the program writing. The program write unit 103 starts the program writing into the terminal storage unit 104 (step S12).

The reception level detection unit 105 determines whether the reception level of the broadcast electric wave is equal to or lower than the reception level A (step S13). When the reception level of the broadcast electric wave is equal to or lower than the reception level A (Yes at step S13), the reception level detection unit 105 generates the reception level A reduction notification, and passes it to the recording request transmission unit 106 and the management information write unit 107.

When receiving the reception level A reduction notification, the recording request transmission unit 106 determines whether the recording request packet has already been transmitted to the server 20 (step S14). When the recording request packet has not been transmitted yet (No at step S14), the recording request transmission unit 106 generates the recording request packet, and transmits it to the server 20 (step S15). When the recording start request packet has already been transmitted (Yes at step S14), the processing proceeds to step S16.

Then, the reception level detection unit 105 determines whether the reception level of the broadcast electric wave is equal to or lower than the reception level B (step S16). When the reception level of the broadcast electric wave is equal to or lower than the reception level B (Yes at step S16), the reception level detection unit 105 generates the reception level B reduction notification, and transmits it to the management information write unit 107 and the program write unit 103.

When receiving the reception level B reduction notification, the management information write unit 107 writes, into the management table 121, the elapsed time from the start of the recording, that is, from step S12 (step S17). Here, an elapsed time 301 to the stop of the recording shown in FIG. 6 and information on an overlapping recording time 401 are written into the management table 121 in association with the A/V file 1. The program write unit 103 stops the program writing into the terminal storage unit 104 (step S18).

Then, the reception level detection unit 105 determines whether the reception level of the broadcast electric wave is higher than the reception level B (step S19). When the reception level of the broadcast electric wave is higher than the reception level B (Yes at step S19), the reception level detection unit 105 generates the reception level B restoration notification, and passes it to the management information write unit 107 and the program write unit 103.

The program write unit 103 resumes the program writing into the terminal storage unit 104 (step S20). The management information write unit 107 records the elapsed time from the stop of the recording into the terminal storage unit 104 (step S21). Here, information on an elapsed time 302 from the stop of the recording to the resumption of the recording is written into the management table 121 together with the IP address of the server 20 in association with the A/V file 2.

The reception level detection unit 105 further determines whether the reception condition is improved and the reception level of the broadcast electric wave is higher than the reception level A (step S22). When the reception level of the broadcast electric wave is higher than the reception level A (Yes at step S22), the reception level detection unit 105 generates the reception level A restoration notification, and passes it to the recording request transmission unit 106. When receiving the reception level A restoration notification, the recording request transmission unit 106 generates the recording stop request packet, and transmits it to the server 20 (step S23).

Then, the program write unit 103 determines whether the program recording is completed (step S24). When the program recording is completed, the management information write unit 107 updates the management table 121 (step S25), and the processing is ended. At this time, the management information write unit 107 writes, into the management table 121, the time from the reception of the level B restoration notification to the reception of the level A restoration notification as the overlapping recording time together with the elapsed time to the stop of the recording. Here, the elapsed time 303 to the stop of the recording shown in FIG. 6 and information on the overlapping recording time 402 are written into the management table 121 in association with the A/V file 3.

When the program recording is not completed at step S24, the process returns to step S13.

When the reception level of the broadcast electric wave is equal to or lower than the reception level A at step S22, the reception level detection unit 105 determines whether the reception level of the broadcast electric wave is equal to or lower than the reception level B (step S26). When the reception level of the broadcast electric wave is higher than reception level B, the process returns to step S22. When the reception level of the broadcast electric wave is equal to or lower than the reception level B, the reception level detection unit 105 generates the reception level B reduction notification, and passes it to the management information write unit 107 and the program write unit 103.

When receiving the reception level B reduction notification, the management information write unit 107 writes the recording resumption time, that is, the elapsed time from step S20 into the management table 121 (step S27). Then, the program write unit 103 stops the program writing into the terminal storage unit 104 (step S28). Then, the process proceeds to step S19.

When the reception level of the broadcast electric wave is higher than the reception level A at step S13, the program write unit 103 determines whether the program recording is completed (S30). When the program recording is completed (No at step S30), the management information write unit 107 updates the management table 121 (step S25), and ends the processing. At this time, the management information write unit 107 writes, into the management table 121, the elapsed time from the start to the stop of the recording by the terminal device 10. When the program recording is not completed (No at step S30), the process returns to step S13.

When the reception level of the broadcast electric wave is higher than the reception level B at step S16, the program write unit 103 determines whether the program recording is completed (step S30). When the program recording is completed (Yes at step S30), the management information write unit 107 updates the management table 121 (step S25), and ends the processing. At this time, the management information write unit 107 writes the overlapping recording time into the management table 121. When the program recording is not completed (No at step S30), the process returns to step S13.

When the reception level of the broadcast electric wave is equal to or lower than the reception level B at step S19, the program write unit 103 determines whether the program recording is completed (step S31). When the program recording is completed (Yes at step S31), the management information write unit 107 updates the management table 121 (step S25), and ends the processing. At this time, the management information write unit 107 writes the overlapping recording time into the management table 121. When the program recording is not completed (No at step S31), the process returns to step S19. The above-described is the processing flow of the terminal device 10 in the broadcast program recording.

Figure 9:
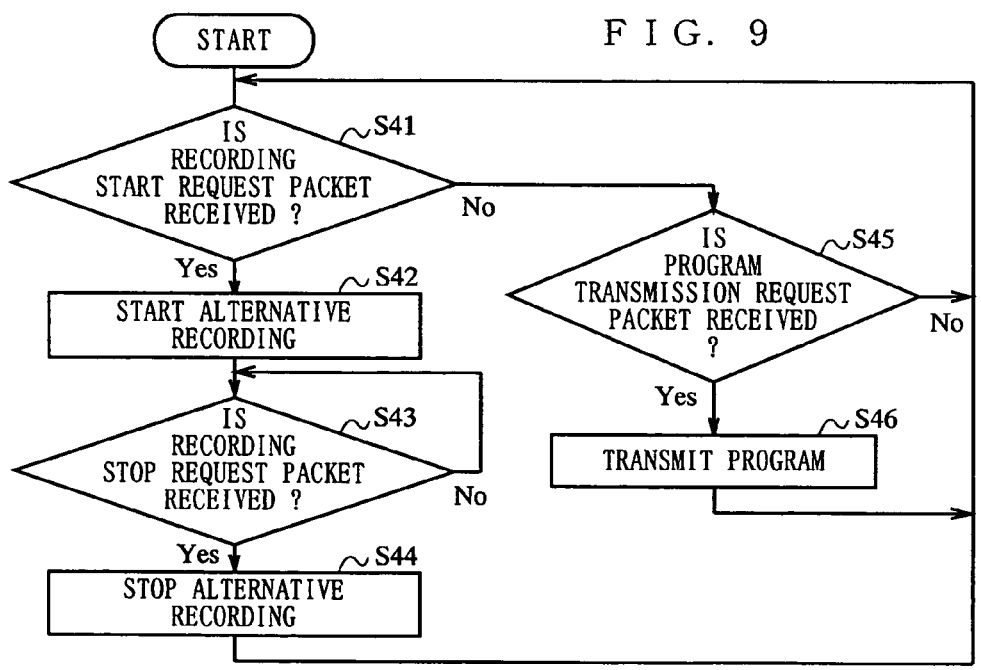
FIG. 9 is a flowchart showing the operation of the server 20.

FIG. 9 is a flowchart showing the operation of the server 20.

First, the recording request reception unit 205 determines whether the recording start request packet transmitted from the terminal device 10 is received (step S41).

When the recording start request packet is received (Yes at step S41), the recording request reception unit 205 instructs the program write unit 203 to start the program writing. The program write unit 203 starts the program writing into the server storage unit 204 using the tuner 202 (step S42).

Then, the recording request reception unit 205 determines whether an alternative recording stop request packet transmitted from the terminal device 10 is received (step S43) When the recording stop request packet is not received (No at step S43), the recording request reception unit 205 returns to the processing of step S43.

When the alternative recording stop request packet is received (Yes at step S43), the recording request reception unit 205 instructs the program write unit 203 to stop the program writing. The program write unit 203 stops the program writing into the server storage unit 204 (step S44).

When the recording start request packet is not received at step S41 (No at step S41), the process proceeds to step S45. At step S45, the program request reception unit 201 determines whether the program transmission request packet is received (step S45). When the program transmission request packet is not received (No at step S45), the process proceeds to step S41.

When the program transmission request packet is received (Yes at step S45), the program request reception unit 201 instructs the program transmission unit 206 to transmit the program held by the server storage unit 204. The program transmission unit 206 reads the program from the server storage unit 204, and transmits it to the terminal device 10 (step S46) Then, the process returns to step S41. The above-described is the processing flow of the server 20.

Figure 10:
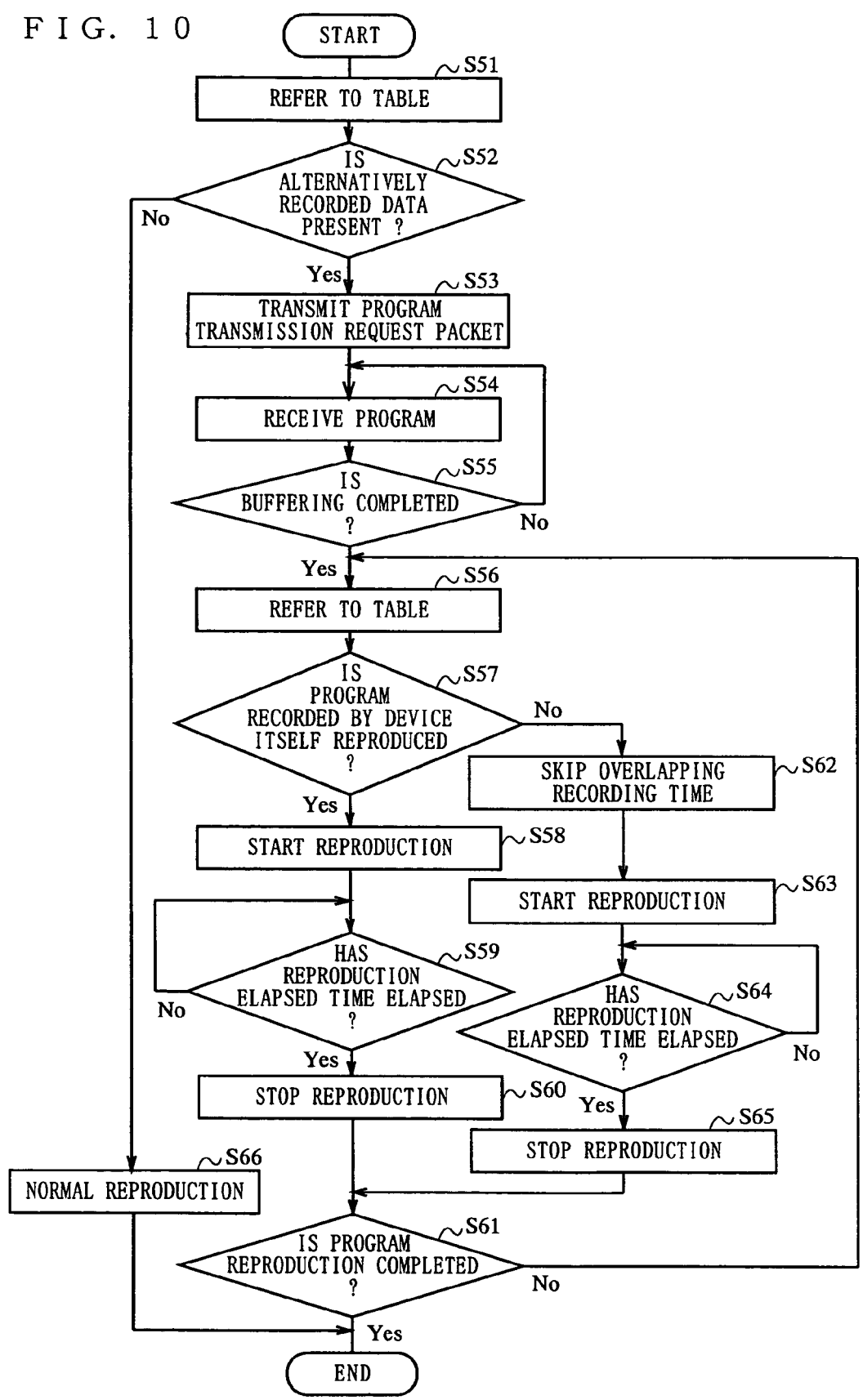
FIG. 10 is a flowchart showing the operation of the terminal device 10 in the continuous reproduction processing.

FIG. 10 is a flowchart showing the operation of the terminal device 10 in the continuous reproduction processing.

First, the continuous reproduction control unit 108 refers to the management table 121 recorded in the terminal storage unit 104 (step S51), and determines whether a program alternatively recorded by the server 20 is present (step S52). The presence or absence of an alternatively recorded program can be determined, for example, by determining whether the IP address of the server is recorded in the management table 121.

When an alternatively recorded program is present (Yes at step S52), the continuous reproduction control unit 108 instructs the program request transmission unit 109 to request the server 20 of the transmission of the program. The program request transmission unit 109 generates the program transmission request packet, and transmits it to the server 20 (step S53).

When receiving the program transmitted from the server 20 (step S54), the program reception unit 110 writes the received program into the program data buffering unit 111. Then, the program reception unit 110 determines whether buffering is completed (step S55).

The program reception unit 110 repeats the processing of steps S54 and S55 until all the received programs are buffered. When the buffering is completed (Yes at step S55), the continuous reproduction control unit 108 refers to the management table 121 (step S56), and determines whether the program recorded by the device itself is reproduced (step S57). At this step S, the continuous reproduction control unit 108 determines in which of the terminal storage unit 104 and the program data buffering unit 111 the program to be reproduced next is recorded.

When the program recorded by the device itself is reproduced (Yes at step S57), the continuous reproduction control unit 108 reads the program from the terminal storage unit 104, and outputs it to the reproduction unit 112. The reproduction unit 112 reproduces the received program (step S58).

Then, the continuous reproduction control unit 108 determines whether the program is reproduced by the reproduction time recorded in the management table 121. The continuous reproduction control unit 108 repeats the processing of step S59 until the reproduction time elapses. When the reproduction time has elapsed (Yes at step S59), the continuous reproduction control unit 108 stops the program reproduction (step S60), and determines whether the program reproduction is completed (step S61). Specifically, the continuous reproduction control unit 108 determines whether all the programs recorded in the management table 121 are reproduced. When the program reproduction is completed, the continuous reproduction control unit 108 ends the processing. When the program reproduction is not completed, the continuous reproduction control unit 108 returns to the processing of step S56.

When the program recorded by the device itself is not reproduced (No at step S57), the continuous reproduction control unit 108 reproduces the program alternatively recorded by the server. The continuous reproduction control unit 108 refers to the management table 121, and skips the reproduction time by the overlapping recording time prior to the reproduction of the program read from the program data buffering unit 111 (step S62). Then, the program reproduction is started (step S63).

Then, the continuous reproduction control unit 108 determines whether the program is reproduced by the reproduction time recorded in the management table 121. The continuous reproduction control unit 108 repeats the processing of step S59 until the reproduction time elapses. When the reproduction time has elapsed (Yes at step S59), the continuous reproduction control unit 108 stops the program reproduction (step S60), and determines whether the program reproduction is completed (step S61).

When it is determined that alternatively recorded data is absent at step S52, the continuous reproduction control unit 108 reads the program from the terminal storage unit 104, and reproduces it normally (step S66).

As described above, according to the present embodiment, the program recorded so as to be distributed between a plurality of devices can be continuously reproduced while the amount of data transfer from the server to the terminal device is minimized. When the reception level of the broadcast electric wave becomes equal to or lower than the reception level A, the terminal device requests the server to alternatively record the program, and when the reception level of the broadcast electric wave becomes equal to or lower than the reception level B, the terminal device stops the program recording by itself. By setting the threshold value of the reception level in two steps, the alternative recording request can be reliably transmitted to the server before the level of the broadcast electric wave is reduced to the reception level B at which the program reception is unreliable.

Preferably, in order that the user can grasp the time of the alternative recording by the server, the user is notified of a ratio of the program alternatively recorded by the server to the program to be reproduced. The ratio of the program alternatively recorded by the server may be expressed, for example, by a time or a data size. More preferably, the user is notified of the charge for the reception of the alternatively recorded program.

Figure 11:
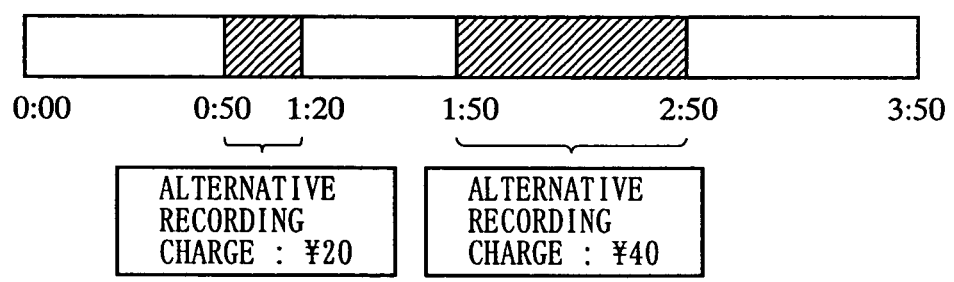
FIG. 11 is a diagram showing a display example of a reproduction bar displayed on the reproduction unit.

FIG. 11 is a diagram showing a display example of a reproduction bar displayed on the reproduction unit. The reproduction bar is displayed for the user to grasp the information on the alternative recording. FIG. 11 depicts a case where program recording is performed from twelve o'clock to three fifty, the white parts represent parts recorded by the terminal device, and the hatched parts represent parts alternatively recorded by the server. It is apparent that when the server performs alternative recording, for example, from twelve fifty to one twenty and from one fifty to two fifty, the communication charge for the program downloading is 20+40=60 (yen). Thereby, the user can easily grasp the charge for watching the program.

The reproduction bar may be displayed so as to be superimposed on the reproduced image while the program is being reproduced on the terminal device, or may be displayed at the user's request. When the reproduction bar is displayed while the program is being reproduced, preferably, the reproduced part in the entire program is indicated on the reproduction bar. The reproduced part may be indicated, for example, by an arrow or by changing the display color of the reproduction bar. Moreover, the reproduction bar may be displayed prior to the reproduction of a program of which data alternatively recorded by the server is present. Thereby, the user can grasp the charge for watching program before reproducing the program.

In the present embodiment, the following three are recorded in the management table: the elapsed time to the stop of the recording (the elapsed times 301 and 303 shown in FIG. 6); the overlapping recording time (the overlapping recording times 401 and 402 shown in FIG. 6); and the elapsed time from the stop to the resumption of the recording (the elapsed time 302 shown in FIG. 6). Here, the information recorded in the management table may be any information that allows the continuous reproduction control unit to perform continuous reproduction, and is not limited to the one mentioned above.

Figure 12:
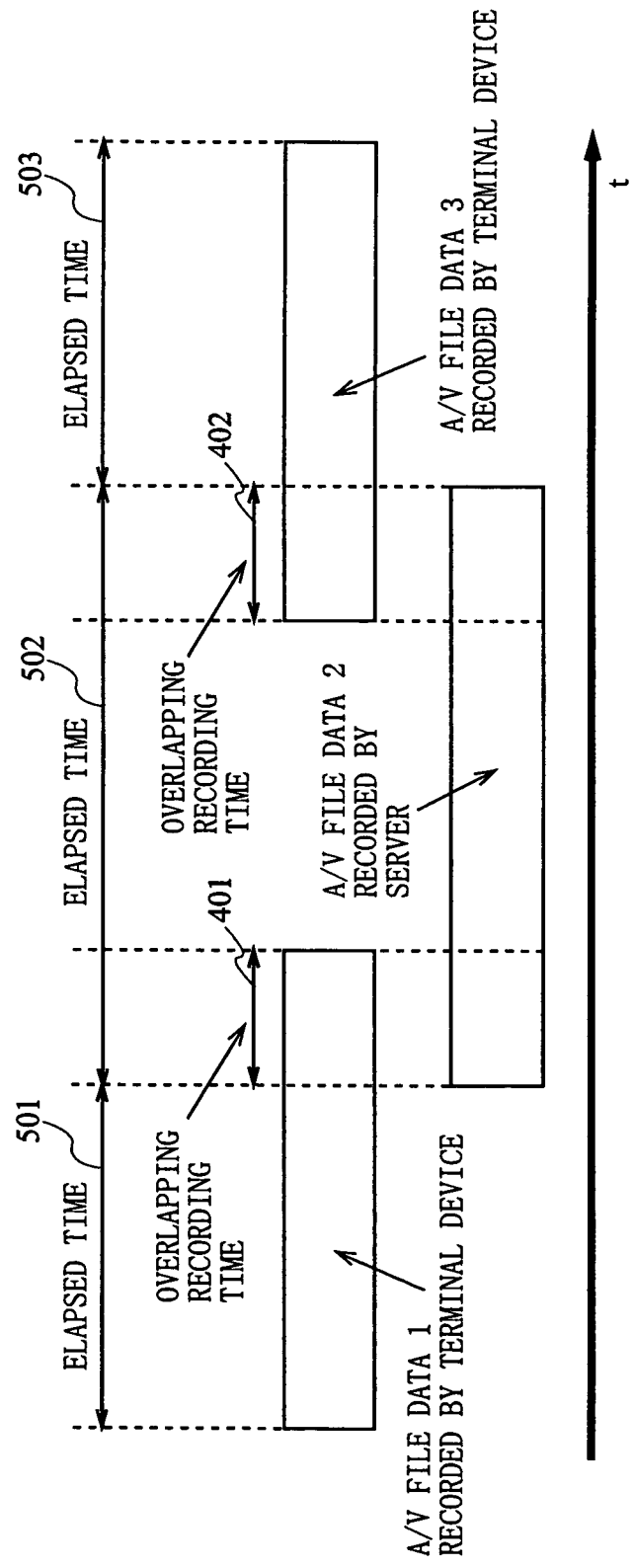
FIG. 12 is a diagram showing another example of the timing when the terminal device 10 continuously reproduces the program recorded by itself and the program alternatively recorded by the server 20.

FIG. 12 is a diagram showing another example of the timing when the terminal device 10 continuously reproduces the program recorded by itself and the program alternatively recorded by the server 20. Here, the terminal device 10 can continuously reproduce the program recorded so as to be distributed between the terminal device and the server by using an elapsed time 501 from the start of the recording to the transmission of the recording start request to the server, the overlapping recording time 401 and an elapsed time 502 from the stop to the resumption of the recording by the terminal device. In this case, the information shown next is recorded in the management table shown in FIG. 4. First, the elapsed time 501 and the overlapping recording time 401 shown in FIG. 12 are recorded in association with the A/V file 1 recorded by the terminal device. Then, the elapsed time 502 shown in FIG. 12 is recorded in association with the A/V file 2 alternatively recorded by the server. As described above, the elapsed times 501 and 502 and the overlapping recording time 401 may be recorded in the management table.

In the present embodiment, the program that the server transmits to the terminal device includes data alternatively recorded during the overlapping recording time. Here, the data alternatively recorded during the overlapping recording time may be omitted and the program recorded only by the server may be transmitted to the terminal device. In this case, information that enables the terminal device to identify the position of the necessary program may be recorded in the program transmission request packet that the terminal device transmits to the server. The information that enables the identification of the position of the program is, for example, the time and the data size. Since this enables the amount of data obtained from the server to be minimized, the user can watch the program at a small charge. Moreover, as mentioned above, the reproduction bar may be displayed before program reproduction and the user may select which one of the programs recorded by the terminal device and the program alternatively recorded by the server is reproduced. This enables the user to select a reproduction method meeting the user's needs.

In the present embodiment, when the terminal device and the server record a program so as to overlap, the program recorded by the terminal device is reproduced. However, for example, when there is a possibility that the quality at the time of reproduction is degraded when the program is in the high-definition television format or when the reception level of the broadcast electric wave in the terminal device becomes equal to or lower than the reception level A, the program obtained from the server may be reproduced in the overlapping recording time. This enables the user to watch high-quality programs.

In the present embodiment, the program to be continuously reproduced is switched based on the time. Here, the program switching timing at the time of continuous reproduction may be determined based on the size of the data recorded during the time interval instead of the time.

In the present embodiment, after the buffering of the program alternatively recorded by the server is completed, the continuous program reproduction is started. Here, since it is necessary for the buffering to be completed by the time the alternatively recorded program is started, while the program previously recorded by the terminal device is being reproduced, in parallel with the program reproduction, the transmission request packet of the alternatively recorded program may be transmitted to the server and buffering may be performed.

In the present embodiment, the IP address of the server is used as the information to specify the server. The information may be any information that enables the identification of the server, and is not limited to the IP address.

In the present embodiment, the terminal device and the server communicate with each other through the Internet. The communication medium that the terminal device and the server use when performing communication may be any communication medium capable of device-to-device communication; for example, it may be a public network such as the telephone network, or a wire/wireless LAN. Moreover, the communication may be performed not through one communication medium but through a combination of a plurality of communication media such as a combination of the Internet and the mobile telephone communication network. When the communication is performed through a combination of a plurality of communication media, different communication media may be used for the inbound communication from the terminal device to the server and for the outbound communication from the server to the terminal device.

It is necessary for the server to have the communication function and have the function of receiving and recording programs being broadcast; for example, it may be a personal computer or a DVD/HDD recorder placed in a private home or computer equipment for business use possessed by a communication common carrier.

When a commercial image is present in the program commonly recorded by the terminal device and the server, the switching of the reproduction of the A/V file data may be performed at the part of the commercial image. There are cases where the quality at the time of image switching can be maintained higher when this is done.

The terminal device 10 may have a function of making a payment for the purchase of a ticket of a transportation or of performing authentication with a wicket machine. In that case, it can be predicted that high-speed movement will be started in the near future after the use of the function. Therefore, the trigger for the terminal device to transmit the alternative recording request packet may be, instead of the reception level of the broadcast electric wave, the timing of making a payment for the purchase of a ticket or performing authentication by the terminal device.

The functional blocks such as the program write unit, the management information write unit and the continuous reproduction control unit are typically implemented as LSIs which are integrated circuits. These elements may be constructed so that each element is formed as one chip or some or all of the elements are included in one chip. The terminal device may have a general-purpose CPU that reads and executes a program to implement the software structure shown in FIG. 1.

While in the present embodiment, the broadcast program recording/reproducing device performs both the program recording and the program reproduction, it may be separated into a broadcast program recording exclusive device and a broadcast program reproduction exclusive device that exclusively perform the program recording and the program reproduction, respectively. The broadcast program recording exclusive device necessarily includes, of the elements shown in FIG. 1, only the mode switching unit 101, the tuner 102, the program write unit 103, the terminal storage unit 104, the reception level detection unit 105, the recording request transmission unit 106, the management information write unit 107, and the reception antenna 113, and the broadcast program reproduction exclusive device necessarily includes, of the elements shown in FIG. 1, only the terminal storage unit 104, the continuous reproduction control unit 108, the program request transmission unit 109, the program reception unit 110, the program data buffering unit 111, and the reproduction unit 112. When the terminal storage unit provided in the broadcast program recording exclusive device is a removable memory, it is unnecessary for the broadcast program reproduction exclusive device to have the terminal storage unit. Moreover, a structure may be adopted that the program request transmission unit 109 and the program reception unit 110 are provided in the broadcast program recording exclusive device and the alternatively recorded program is obtained from the server before the data of the program is moved to the broadcast program reproduction exclusive device.

(Second Embodiment)

In the first embodiment, the terminal device determines whether to request the server of the alternative program recording based on the two reception levels. Here, the terminal device may determine whether to request the server of the alternative program recording based on one reception level. The present embodiment is characterized in that the terminal device determines whether to request the server of the alternative program recording based on one reception level.

Since the structure of a broadcast program recording/reproducing system having a broadcast program recording/reproducing device according to the second embodiment of the present invention is similar to that of the first embodiment, FIG. 1 is employed. Hereinafter, the differences from the first embodiment will mainly be described.

Figure 13:
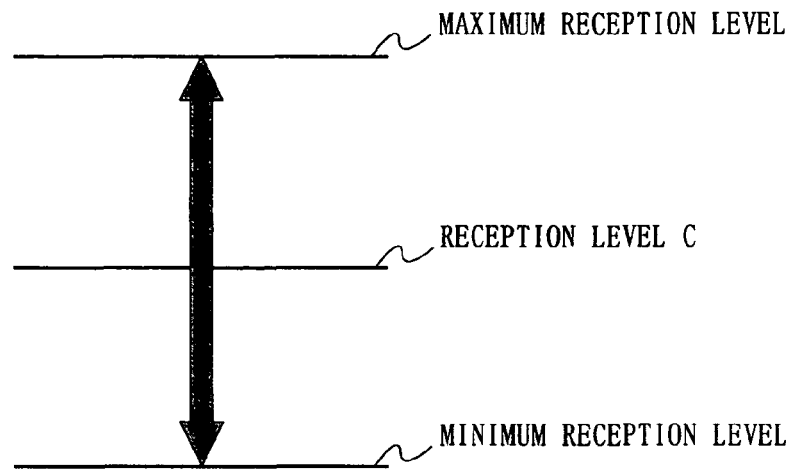
FIG. 13 is a diagram showing the relation among the reception levels that the reception level detection unit 105 uses as the judgment criterion for the control in a second embodiment of the present invention.

FIG. 13 is a diagram showing the relation among the reception levels that the reception level detection unit 105 uses as the judgment criterion for the control. As mentioned above, a difference from the first embodiment is that the number of threshold values is one. For distinction from the reception levels A and B used in the first embodiment, the threshold value used in the present embodiment will be called a reception level C.

When the detected reception level of the broadcast electric wave becomes equal to or lower than the reception level C, the reception level detection unit 105 generates a reception level C reduction notification, and passes it to the management information write unit 107, the program write unit 103, and the recording request transmission unit 106. On the other hand, after the level C reduction notification is generated, when the detected reception level of the broadcast electric wave is restored and becomes higher than the reception level C, the reception level detection unit 105 generates a reception level C restoration notification, and passes it to the management information write unit 107, the program write unit 103, and the recording request transmission unit 106.

The reception level detection unit 105 stores, in a non-illustrated memory, information representing that the reception level C reduction notification and the reception level C restoration notification are generated like in the first embodiment. Then, with reference to the memory, the reception level detection unit 105 determines which range of the reception level is to be monitored. After generating the reception level C reduction notification, the reception level detection unit 105 monitors whether the reception level of the broadcast electric wave becomes higher than the reception level C. On the other hand, after generating the reception level C restoration notification, the reception level detection unit 105 monitors whether the reception level of the broadcast electric wave becomes equal to or lower than the reception level C.

When receiving the reception level C reduction notification or the reception level C restoration notification from the reception level detection unit 105, the management information write unit 107 records the information necessary for continuous reproduction into the management table 121. When receiving the reception level C reduction notification from the reception level detection unit 105, the program write unit 103 stops the program writing, and when receiving the reception level C restoration notification, the program write unit 103 resumes the program writing.

When receiving the reception level C reduction notification, the recording request transmission unit 106 generates the recording start request packet and transmits it to the server 20, and when receiving the reception level C restoration notification, the recording request transmission unit 106 generates the recording stop request packet and transmits it to the server 20.

Figure 14:
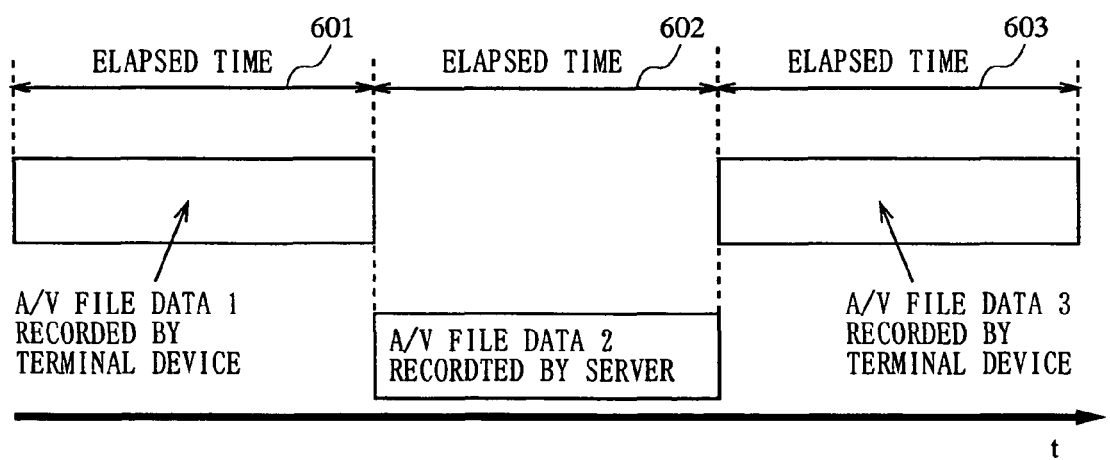
FIG. 14 is a diagram showing an example of the timing when the terminal device 10 continuously reproduces the program recorded by itself and the program alternatively recorded by the server 20 in the second embodiment.

FIG. 14 is a diagram showing another example of the timing when the terminal device 10 continuously reproduces the program recorded by itself and the program alternatively recorded by the server 20. FIG. 14 depicts an example in which the program is recorded in the order of the A/V file 1, the A/V file 2, and the A/V file 3. The A/V file 1 and the A/V file 3 are the part of the program recorded by the terminal device 10, and the A/V file 2 is the part of the program alternatively recorded by the server 20.

The management information write unit 107 records, into the management table 121, an elapsed time 601 from the start of the program writing to the reception of the reception level C reduction notification so as to be associated with the A/V file 1. Then, the management information write unit 107 records, into the management table 121, an elapsed time 602 from the reception of the reception level C reduction notification to the reception of the reception level C restoration notification together with the IP address of the server 20 so as to be associated with the A/V file 2. Further, the management information write unit 107 records, into the management table 121, an elapsed time 603 from the reception of the reception level C restoration notification to the completion of the program recording.

Figure 15:
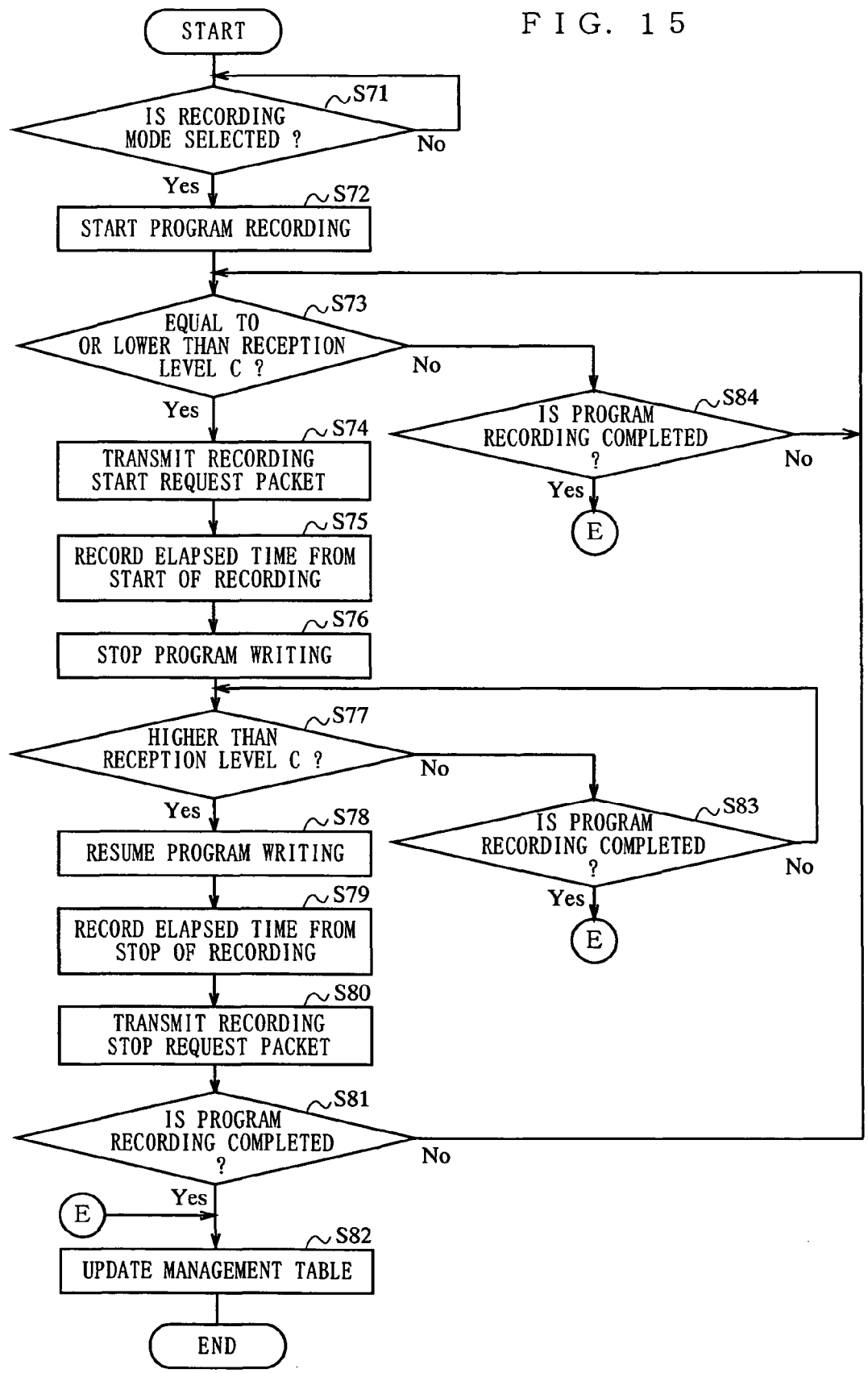
FIG. 15 is a flowchart showing the operation of the terminal device 10 according to the second embodiment of the present invention.

FIG. 15 is a flowchart showing the operation of the terminal device 10 according to the present embodiment. Since the processing of steps S71 and S72 is similar to that of steps S11 and S12 shown in FIG. 7, a description thereof is omitted.

At the succeeding step S73, the reception level detection unit 105 determines whether the reception level of the broadcast electric wave is equal to or lower than the reception level C. When the reception level of the broadcast electric wave is equal to or lower than the reception level C (Yes at step S73), the reception level detection unit 105 generates the reception level C reduction notification, and passes it to the management information write unit 107, the program write unit 103, and the recording request transmission unit 106.

When receiving the reception level C reduction notification, the recording request transmission unit 106 generates the recording request packet, and transmits it to the server 20 (step S74). When receiving the reception level C reduction notification, the management information write unit 107 writes the recording start time, that is, the elapsed time from step S72 into the terminal storage unit 104 (step S75). Then, the program write unit 103 stops the program writing into the terminal storage unit 104 (step S76).

Then, the reception level detection unit 105 determines whether the reception level of the broadcast electric wave is restored and becomes higher than the reception level C (step S77). When the reception level of the broadcast electric wave is equal to or lower than the reception level C (No at step S77), the process returns to step S77.

When the reception level of the broadcast electric wave is higher than the reception level C (Yes at step S77), the reception level detection unit 105 generates the reception level C restoration notification, and passes it to the management information write unit 107, the program write unit 103, and the recording request transmission unit 106.

The program write unit 103 resumes the program writing into the terminal storage unit 104 (step S78). The management information write unit 107 records the elapsed time from the stop of the recording into the terminal storage unit 104 (step S79). When receiving the reception level C restoration notification, the recording request transmission unit 106 generates the recording stop request packet, and transmits it to the server 20 (step S80).

Then, the program write unit 103 determines whether the program recording is completed (step S81). When the program recording is completed (Yes at step S81), the management information write unit 107 updates the management table 121 (step S82), and ends the processing. At this time, the management information write unit 107 writes, into the management table 121, the time from the reception of the level C reduction notification to the reception of the level C restoration notification. When the program recording is not completed (No at step S81), the process returns to step S73.

On the other hand, when the reception level of the broadcast electric wave is higher than the reception level C at step S73, the program write unit 103 determines whether the program recording is completed (step S83). When the program recording is completed (Yes at step S83), the management information write unit 107 updates the management table 121 (step S82), and ends the processing. At this time, the management information write unit 107 writes, into the management table 121, the elapsed time from the start to the stop of the recording by the terminal device 10. When the program recording is not completed (No at step S83), the process returns to step S73.

On the other hand, when the reception level of the broadcast electric wave is equal to or lower than the reception level C at step S77, the program write unit 103 determines whether the program recording is completed (step S84). When the program recording is completed (Yes at step S84), the management information write unit 107 updates the management table 121 (step S82), and ends the processing. At this time, the management information write unit 107 writes, into the management table 121, the elapsed time from the stop of the recording by the terminal device 10 to the completion of the program recording. On the other hand, when the program recording is not completed (No at step S84), the process returns to step S77.

As described above, according to the present embodiment, a broadcast program recorded in a plurality of devices can be continuously reproduced.

INDUSTRIAL APPLICABILITY

The present invention is useful as a broadcast program recording/reproducing device and a broadcast program recording/reproducing method capable of continuously reproducing a program recorded so as to be distributed between a plurality of devices.

The invention claimed is:

1. A broadcast program recording/reproducing device which records a program being broadcast and reproduces the program, the device comprising:
   a storage unit operable to store the program;
   a program write unit operable to write the received program into the storage unit;
   a reception level detection unit operable to detect whether a reception level of a received broadcast electric wave is (i) equal to or lower than a first predetermined reception level and (ii) equal to or lower than a second predetermined reception level;
   a recording start request transmission unit operable, when the reception level detected by the reception level detection unit is equal to or lower than the first predetermined reception level, to generate a recording start request to request an external device to alternatively record at least part of the program, and to transmit the recording start request to the external device;
   a management information storage unit operable to store management information to manage a destination of the recording of the program and a timing to switch the recording;
   a distributive recording determination unit operable to determine whether the program is recorded so as to be distributed between the storage unit and the external device based on the management information stored in the management information storage unit; and
   a continuous reproduction unit operable to obtain an appropriate part of the program from the storage unit and the external device and to continuously reproduce the program, without temporal interruption of the program, based on the management information when the distributive recording determination unit determines that the program is recorded so as to be distributed, and to obtain the program from the storage unit and to reproduce the program when the distributive recording determination unit determines that the program is not recorded so as to be distributed,
   wherein the first predetermined reception level is higher than the second predetermined reception level, and
   wherein the program write unit stops the writing into the storage unit when the reception level detected by the reception level detection unit is equal to or lower than the second predetermined reception level.

2. The broadcast program recording/reproducing device according to claim 1, further comprising a recording stop request transmission unit operable to generate a recording stop request to request for the stop of the alternative recording of the program and transmitting the recording stop request to the external device when the reception level detected by the reception level detection unit becomes higher than the first predetermined reception level after the recording start request is transmitted by the recording start request transmission unit.

3. The broadcast program recording/reproducing device according to claim 1, wherein the program write unit resumes the writing into the storage unit when the reception level detected by the reception level detection unit becomes higher than the second predetermined reception level.

4. The broadcast program recording/reproducing device according to claim 1, wherein the management information includes: information on a time for reproduction within a time period when the program is written by the program write unit;

and information on a time for reproduction within a time period when the program is alternatively recorded by the external terminal.

5. The broadcast program recording/reproducing device according to claim 4, wherein the management information further includes: information to identify the external device to which the recording start request is transmitted; and information on an order in which the program alternatively recorded by the external device and the program stored in the storage unit are reproduced.

6. The broadcast program recording/reproducing device according to claim 1, wherein the management information includes: information on a data amount of a program to be reproduced, with respect to the program written by the program write unit; and information on a data amount of a program to be reproduced, with respect to the program alternatively recorded by the external device.

7. The broadcast program recording/reproducing device according to claim 6, wherein the management information further includes: information to identify the external device to which the recording start request is transmitted; and information on an order in which the program alternatively recorded by the external device and the program stored in the storage unit are reproduced.

8. The broadcast program recording/reproducing device according to claim 1, further comprising
a management information write unit operable to write the management information into the management information storage unit when the reception level detected by the reception level detection unit is equal to or lower than the second predetermined reception level.

9. The broadcast program recording/reproducing device according to claim 8, further comprising a recording stop request transmission unit operable to generate a recording stop request to request for the stop of the alternative recording of the program and transmitting the recording stop request to the external device when the reception level detected by the reception level detection unit is higher than the first predetermined reception level after the recording start request is transmitted by the recording start request transmission unit.

10. The broadcast program recording/reproducing device according to claim 8, wherein the program write unit resumes the writing into the storage unit when the reception level detected by the reception level detection unit is higher than the second predetermined reception level.

11. The broadcast program recording/reproducing device according to claim 8, wherein the management information includes: information on a time for reproduction within a time period when the program is written by the program write unit; and information on a time for reproduction within a time period when the program is alternatively recorded by the external terminal.

12. The broadcast program recording/reproducing device according to claim 11, wherein the management information further includes: information to identify the external device to which the recording start request is transmitted; and information on an order in which the program alternatively recorded by the external device and the program stored in the storage unit are reproduced.

13. The broadcast program recording/reproducing device according to claim 8, wherein the management information includes: information on a data amount of a program to be reproduced, with respect to the program written by the program write unit; and information on a data amount of a program to be reproduced, with respect to the program alternatively recorded by the external device.

14. The broadcast program recording/reproducing device according to claim 13, wherein the management information further includes: information to identify the external device to which the recording start request is transmitted; and information on an order in which the program alternatively recorded by the external device and the program stored in the storage unit are reproduced.

15. A broadcast program recording device which records a program being broadcast, the device comprising:
a storage unit operable to store the program;
a program write unit operable to write the received program into the storage unit;
a reception level detection unit operable to detect whether a reception level of a received broadcast electric wave is (i) equal to or lower than a first predetermined reception level and (ii) equal to or lower than a second predetermined reception level;
a recording start request transmission unit operable, when the reception level detected by the reception level detection unit is equal to or lower than the first predetermined reception level, to generate a recording start request to request an external device to alternatively record at least part of the program, and to transmit the recording start request to the external device; and
a management information storage unit operable to store management information to manage a destination of the recording of the program and a timing to switch the recording,
wherein the first predetermined reception level is higher than the second predetermined reception level, and
wherein the program write unit stops the writing into the storage unit when the reception level detected by the reception level detection unit is equal to or lower than the second predetermined reception level.

16. A broadcast program reproduction device that reproduces a broadcast program stored in a storage unit, wherein
management information to manage a destination of the recording of the broadcast program and a timing to switch the recording is stored in the storage unit, and
the broadcast program reproduction device comprises:
a distributive recording determination unit operable to determine whether the program is recorded so as to be distributed between the storage unit and the external device based on the management information; and
a continuous reproduction unit operable to obtain an appropriate part of the broadcast program from the storage unit and the external device and to continuously reproduce the program, without temporal interruption of the program, based on the management information when the distributive recording determination unit determines that the broadcast program is recorded so as to be distributed, and to obtain the broadcast program from the storage unit and to reproduce the broadcast program when the distributive recording determination unit determines that the broadcast program is not recorded so as to be distributed.

17. A broadcast program recording/reproducing method of recording a program being broadcast and reproducing the program, the method comprising:
a step of writing a received program into a storage unit;
a step of detecting whether a reception level of a received broadcast electric wave is (i) equal to or lower than a first predetermined reception level and (ii) equal to or lower than a second predetermined reception level;
a step of, when the reception level detected at the step of detecting is equal to or lower than the first predetermined reception level, generating a recording start request to request an external device to alternatively record at least part of the program, and transmitting the recording start request to the external device;

a step of storing management information to manage a destination of the recording of the program and a timing to switch the recording;

a step of determining whether the program is recorded so as to be distributed between the storage unit and the external device based on the management information stored at the step of storing the management information; and a step of obtaining an appropriate part of the program from the storage unit and the external device based on the management information and continuously reproducing the program, without temporal interruption of the program, when it is determined that the program is recorded so as to be distributed at the step of determining the presence or absence of the distributive recording, and obtaining the program from the storage unit and reproducing the program when it is determined that the program is not recorded so as to be distributed at the step of determining the presence or absence of the distributive recording, wherein the first predetermined reception level is higher than the second predetermined reception level, and wherein, at the step of writing the received program, the writing into the storage unit is stopped when the reception level detected at the step of detecting is equal to or lower than the second predetermined reception level.

18. A non-transitory medium having a computer program stored thereon for recording a program being broadcast and reproducing the program, the computer program causing a computer to perform a method comprising:

a step of writing a received program into a storage unit;

a step of detecting whether a reception level of a received broadcast electric wave is (i) equal to or lower than a first predetermined reception level and (ii) equal to or lower than a second predetermined reception level;

a step of, when the reception level detected at the step of detecting is equal to or lower than the first predetermined reception level, generating a recording start request to request an external device to alternatively record at least part of the program, and transmitting the recording start request to the external device;

a step of storing management information to manage a destination of the recording of the program and a timing to switch the recording;

a step of determining whether the program is recorded so as to be distributed between the storage unit and the external device based on the management information stored at the step of storing the management information; and a step of obtaining an appropriate part of the program from the storage unit and the external device based on the management information and continuously reproducing the program, without temporal interruption of the program, when it is determined that the program is recorded so as to be distributed at the step of determining the presence or absence of the distributive recording, and obtaining the program from the storage unit and reproducing the program when it is determined that the program is not recorded so as to be distributed at the step of determining the presence or absence of the distributive recording, wherein the first predetermined reception level is higher than the second predetermined reception level, and wherein, at the step of writing the received program, the writing into the storage unit is stopped when the reception level detected at the step of detecting is equal to or lower than the second predetermined reception level.

19. An integrated circuit of a broadcast program recording/reproducing device which records a program being broadcast and reproduces the program, the integrated circuit comprising:

a storage unit operable to store the program;

a program write unit operable to write the received program into the storage unit;

a reception level detection unit operable to detect whether a reception level of a received broadcast electric wave is (i) equal to or lower than a first predetermined reception level and (ii) equal to or lower than a second predetermined reception level;

a recording start request transmission unit operable, when the reception level detected by the reception level detection unit is equal to or lower than the first predetermined reception level, to generate a recording start request to request an external device to alternatively record at least part of the program, and to transmit the recording start request to the external device;

a management information storage unit operable to store management information to manage a destination of the recording of the program and a timing to switch the recording;

a distributive recording determination unit operable to determine whether the program is recorded so as to be distributed between the storage unit and the external device based on the management information stored in the management information storage unit; and a continuous reproduction unit operable to obtain an appropriate part of the program from the storage unit and the external device and to continuously reproduce the program, without temporal interruption of the program, based on the management information when the distributive recording determination unit determines that the program is recorded so as to be distributed, and to obtain the program from the storage unit and to reproduce the program when the distributive recording determination unit determines that the program is not recorded so as to be distributed, wherein the first predetermined reception level is higher than the second predetermined reception level, and wherein the program write unit stops the writing into the storage unit when the reception level detected by the reception level detection unit is equal to or lower than the second predetermined reception level.

* * * * *